United States Patent
Wada et al.

(10) Patent No.: US 12,197,906 B2
(45) Date of Patent: Jan. 14, 2025

(54) ONBOARD DEVICE, VEHICLE, CONTROL METHOD AND NON-TRANSITORY COMPUTER READABLE RECORDING MEDIUM STORING AN ONBOARD PROGRAM

(71) Applicants: TOYOTA JIDOSHA KABUSHIKI KAISHA, Toyota (JP); DENSO CORPORATION, Kariya (JP)

(72) Inventors: Ryusei Wada, Toyota (JP); Kotaro Wakiguchi, Kariya (JP); Yuto Hirashima, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 140 days.

(21) Appl. No.: 18/053,802

(22) Filed: Nov. 9, 2022

(65) Prior Publication Data

US 2023/0176853 A1  Jun. 8, 2023

(30) Foreign Application Priority Data

Dec. 2, 2021   (JP) ................. 2021-196494

(51) Int. Cl.
*G06F 9/44* (2018.01)
*G06F 8/65* (2018.01)
(52) U.S. Cl.
CPC ...................... *G06F 8/65* (2013.01)

(58) Field of Classification Search
None
See application file for complete search history.

(56) References Cited

U.S. PATENT DOCUMENTS

| 11,579,865 | B2 * | 2/2023 | Sakurai | G06F 8/65 |
| 11,924,726 | B2 * | 3/2024 | Watanabe | H04L 12/40 |
| 2006/0232816 | A1 * | 10/2006 | Konno | G06F 8/65 |
| | | | | 358/1.15 |
| 2019/0265965 | A1 * | 8/2019 | Acharya | G06F 8/65 |
| 2020/0183676 | A1 * | 6/2020 | Sakurai | G06F 8/65 |
| 2021/0084464 | A1 | 3/2021 | Watanabe et al. | |
| 2022/0283796 | A1 * | 9/2022 | McFarland, Jr. | G06F 8/65 |

FOREIGN PATENT DOCUMENTS

| EP | 1654640 A2 | 5/2006 |
| EP | 3839723 A1 | 6/2021 |
| JP | 2021048495 A | 3/2021 |
| WO | 2004/109510 A2 | 12/2004 |

* cited by examiner

*Primary Examiner* — Qamrun Nahar
(74) *Attorney, Agent, or Firm* — Dickinson Wright, PLLC

(57) ABSTRACT

An onboard device comprising a processor, wherein the processor: at an onboard device installed at a vehicle, records a control program that is recorded in a first recording medium and that carries out processing for controlling the onboard device, and an application program that is recorded in a second recording medium different than the first recording medium and that carries out processing on the onboard device; acquires an update package including at least one of a first program that updates the control program, or a second program that updates the application program; and carries out updating of the control program and the application program in accordance with the acquired update package.

7 Claims, 7 Drawing Sheets

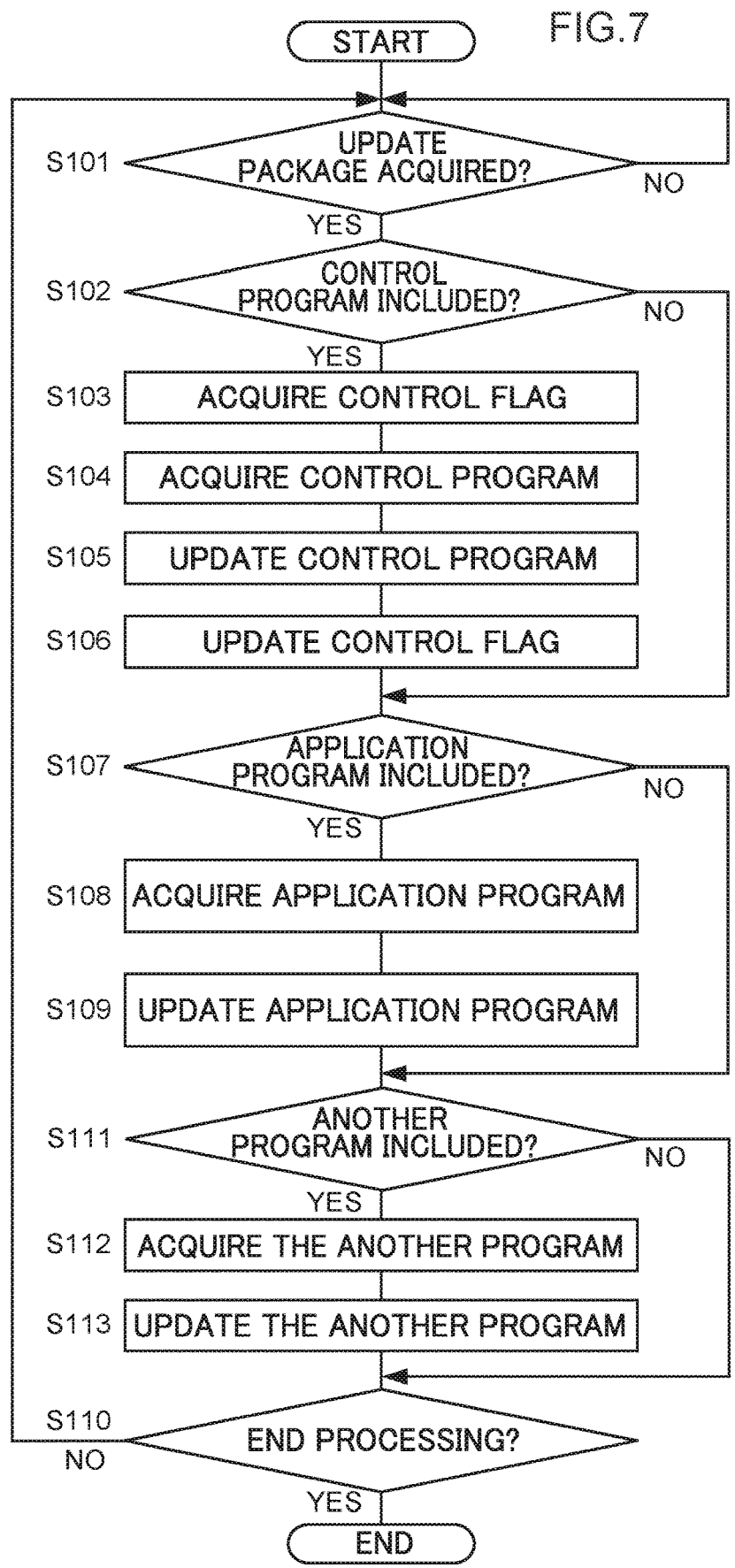

ONBOARD DEVICE, VEHICLE, CONTROL METHOD AND NON-TRANSITORY COMPUTER READABLE RECORDING MEDIUM STORING AN ONBOARD PROGRAM

CROSS-REFERENCE TO RELATED APPLICATION

This application is based on and claims priority under 35 USC 119 from Japanese Patent Application No. 2021-196494 filed on Dec. 2, 2021, the disclosure of which is incorporated by reference herein.

BACKGROUND

Technical Field

The present disclosure relates to an onboard device, a vehicle, a control method, and a non-transitory recording medium storing an onboard program, which update programs that control a vehicle.

Related Art

Japanese Patent Application Laid-Open (JP-A) No. 2021-048495 discloses an onboard updating device that updates programs and data of an onboard device installed in a vehicle.

There are cases in which a control program that controls an onboard device, and an application program that operates on the onboard device, are installed in the onboard device.

However, if the recording media on which the control program and the program of the application are recorded are different, at the time of updating the control program and the program of the application, the updates are carried out at different opportunities, and updating of the programs is not always carried out efficiently.

SUMMARY

An object of the present disclosure is to provide an onboard device, a vehicle, a control method, and a non-transitory recording medium on which an onboard program is recorded, which can update programs efficiently.

An onboard device of a first aspect includes: a recording section that, at an onboard device installed at a vehicle, records a control program that is recorded in a first recording medium and that carries out processing for controlling the onboard device, and an application program that is recorded in a second recording medium different than the first recording medium and that carries out processing on the onboard device; an acquiring section that acquires an update package including at least one of a first program that updates the control program, or a second program that updates the application program; and an updating section that carries out updating of the control program and the application program in accordance with the acquired update package.

The onboard device of the first aspect acquires an update package that includes at least one of a control program that controls the onboard device, and an application program that carries out processing on the onboard device. The onboard device carries out updating of the control program and the application program that are recorded in the onboard device, in accordance with the update package.

Namely, in accordance with this onboard device, by acquiring the update package, updating of the control program and of the application program are carried out upon the same occasion. Due thereto, the programs can be updated efficiently.

In an onboard device of a second aspect, in the onboard device of the first aspect, in a case in which a third program that updates another program stored in another onboard device is further included in the update package, the updating section transmits the third program to the another onboard device and carries out updating of the another program.

In accordance with the onboard device of the second aspect, the programs of the onboard device at the vehicle can be updated upon the same occasion.

In an onboard device of a third aspect, in the onboard device of the first aspect or the second aspect, the acquiring section acquires the update package via wireless communication.

In accordance with the onboard device of the third aspect, the update package can be acquired easily.

In an onboard device of a fourth aspect, in the onboard device of any one of the first aspect through the third aspect, the recording section records, as the control program at the first recording medium, a control program that is before updating and a control program that is after updating, and the updating section manages updating of the control program by using a flag.

In accordance with the onboard device of the fourth aspect, even in a case in which updating fails, the control program can be returned to the control program that is before the updating.

A vehicle of a fifth aspect includes: the onboard device of any one of the first aspect through the fourth aspect; and at least one other onboard device that is connected to the onboard device.

In accordance with the vehicle of the fifth aspect, the programs of the onboard device that is installed in the vehicle can be updated.

A control method of a sixth aspect: at an onboard device installed at a vehicle, recording a control program that is recorded in a first recording medium and that carries out processing for controlling the onboard device, and an application program that is recorded in a second recording medium different than the first recording medium and that carries out processing on the onboard device; acquires an update package including at least one of a first program that updates the control program, or a second program that updates the application program; and carries out updating of the control program and the application program in accordance with the acquired update package.

In accordance with the control method of the sixth aspect, an update package, which includes at least one of a control program that controls the onboard device and an application program that carries out processing on the onboard device, is acquired. Updating of the control program and of the application program that are recorded in the onboard device are carried out in accordance with the update package. Namely, in accordance with this control method, by acquiring the update package, updating of the control program and of the application program are carried out upon the same occasion. Due thereto, the programs can be updated efficiently.

A seventh aspect is a non-transitory computer-readable recording medium storing an onboard program. This onboard program executable by a computer to perform processing comprising: at an onboard device installed at a vehicle, recording a control program that is recorded in a first recording medium and that carries out processing for controlling the onboard device, and an application program that is recorded in a second recording medium different than the first recording medium and that carries out processing on the onboard device; acquiring an update package including at least one of a first program that updates the control program, or a second program that updates the application program; and carrying out updating of the control program and the application program in accordance with the acquired update package.

The computer, at which is executed the onboard program that is stored in the non-transitory recording medium of the seventh aspect, updates the control program and the application program that are recorded in the onboard device. The computer acquires an update package that includes at least one of a control program that controls the onboard device, and an application program that carries out processing on the onboard device. The computer carries out updating of the control program and the application program that are recorded in the onboard device, in accordance with the update package. Namely, in accordance with the computer at which this onboard program is executed, by acquiring the update package, updating of the control program and of the application program are carried out upon the same occasion. Due thereto, the programs can be updated efficiently.

In accordance with the present disclosure, programs can be updated efficiently.

BRIEF DESCRIPTION OF THE DRAWINGS

Exemplary embodiments of the present disclosure will be described in detail based on the following figures, wherein:

FIG. 7 is a flowchart illustrating the flow of the processing of updating programs, which is executed at the onboard device of a second embodiment.

DETAILED DESCRIPTION

First Embodiment

An onboard system that includes a vehicle, in which the onboard device of the present disclosure is installed, and a central server is described. The onboard system updates a control program and an application program that are recorded in the onboard device, by using an update package acquired from the central server.

(Overall Structure)

Figure 1:
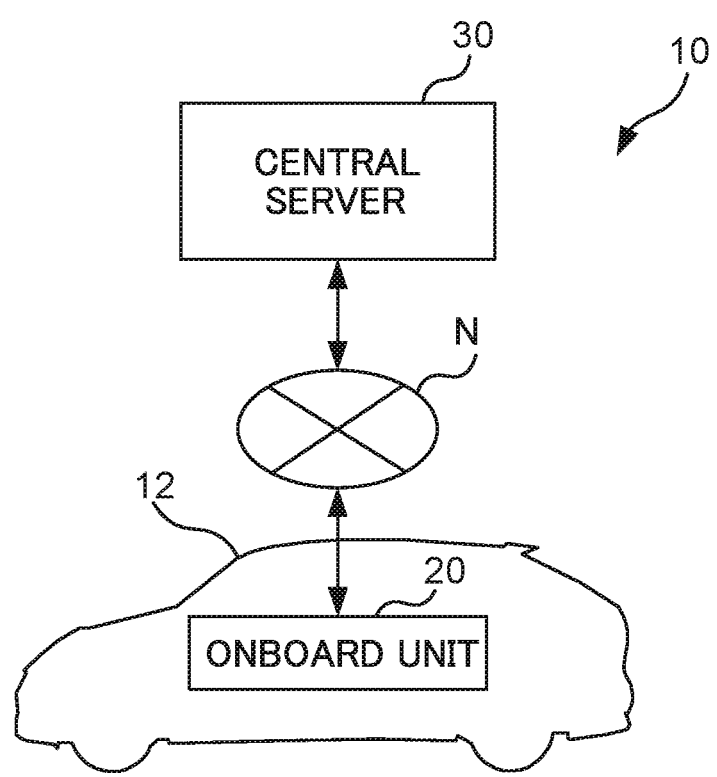
FIG. 1 is a drawing illustrating the schematic structure of an onboard system relating to respective embodiments.

As illustrated in FIG. 1, an onboard system 10 of embodiments of the present disclosure is structured to include a vehicle 12 and a central server 30. An onboard unit 20 serving as the onboard device is installed in the vehicle 12. The onboard unit 20 and the central server 30 are connected to one another through network N.

The onboard unit 20 acquires (OTA: Over the Air), from the central server 30 and via the network N which uses wireless communications or the like, a control program that controls the onboard unit 20, and an application program that carries out processing on the onboard unit. The onboard unit 20 carries out updating of the respective programs recorded in the onboard unit 20 by using the control program and the application program that are included in the acquired update package. Here, the onboard unit 20 is an example of the "onboard device". Further, the control program included in the update package is an example of the "first program", and the application program included in the update package is an example of the "second program".

Figure 2:
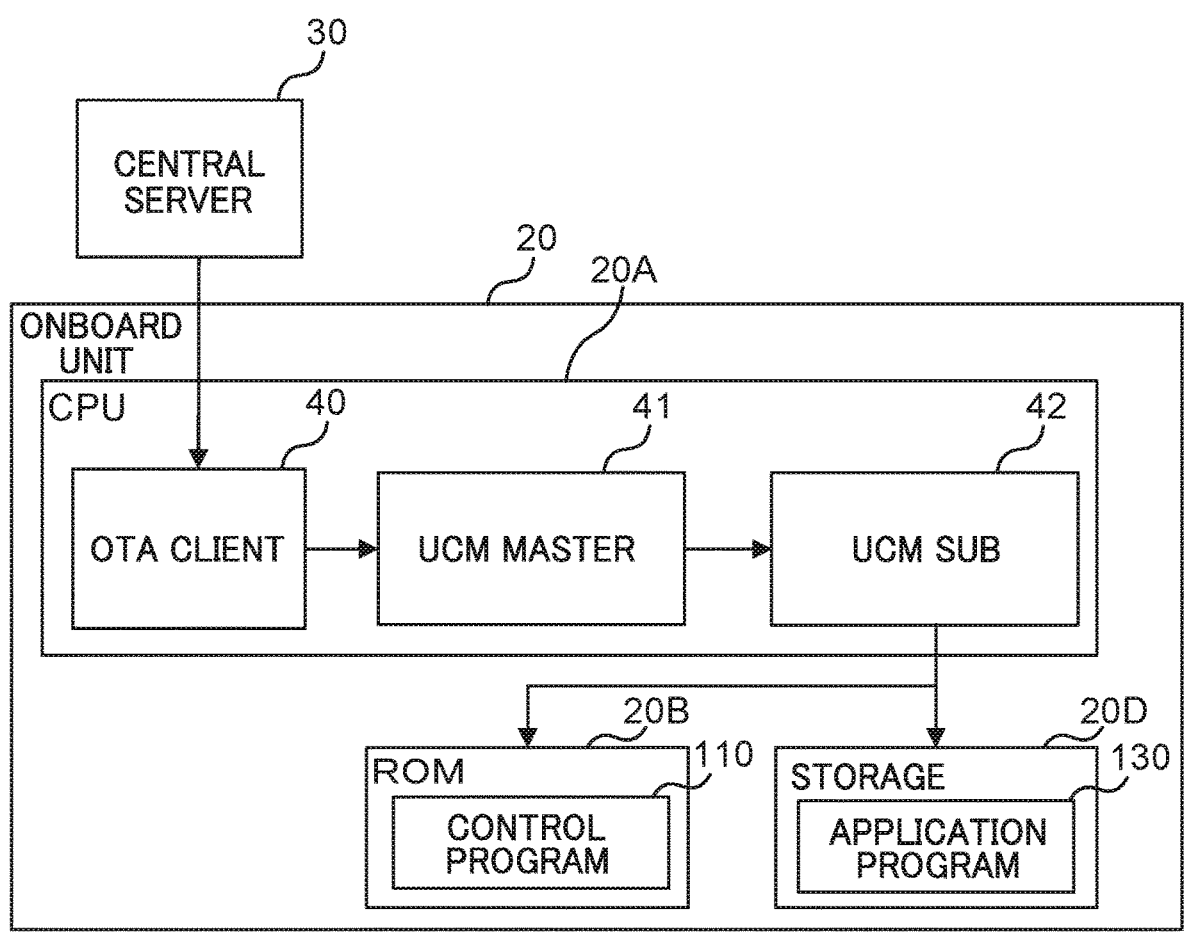
FIG. 2 is a block drawing that illustrates structures and is provided in order to explain the functions of the onboard system relating to the respective embodiments.

As an example, as illustrated in FIG. 2, the onboard unit 20 has a CPU (Central Processing Unit) 20A, a ROM (Read Only Memory) 20B and a storage 20D which are described later. Here, the ROM 20B is an example of the "first recording medium", and the storage 20D is an example of the "second recording medium".

The CPU 20A that is installed in the onboard unit 20 functions as an OTA client 40, a UCM (Update and Configuration Management) master 41, and a UCM sub 42. Further, a control program 110 that is described later is stored in the ROM 20B, and an application program 130 that is described later is stored in the storage 20D.

As illustrated in FIG. 2, the OTA client 40 acquires an update package from the central server 30, and inputs the update package to the UCM master 41. The UCM master 41 manages the updating of programs relating to the ECUs (Electronic Control Units) that are installed in the vehicle 12. The UCM sub 42 manages the updating of the programs at the onboard unit 20. In accordance with the programs that are included in the inputted update package, the UCM master 41 distributes and updates the respective programs.

For example, in a case in which the control program 110 and the application program 130 that are described later are included in the update package, these respective programs are inputted to the UCM sub 42. The UCM sub 42 updates the control program 110 stored in the ROM 20B of the onboard unit 20 and the application program 130 stored in the storage 20D, by using the acquired control program 110 and application program 130. Further, in a case in which a program relating to another ECU that is different than the onboard unit 20 (hereinafter called "another program") is included in the update package, the UCM master 41 distributes the another program to that another ECU and updates the another program.

Note that the one vehicle 12 that includes the onboard unit 20 is illustrated with respect to the one central server 30 in FIG. 1 and FIG. 2. However, the numbers of the vehicle 12, the onboard unit 20 and the central server 30 are not limited to these. Further, a form is described in which the onboard unit 20 relating to the present embodiment acquires the update package by using wireless communication. However, the present disclosure is not limited to this. The update package may be acquired via an interface. For example, the update package may be acquired via an interface from an external recording device such as an SD (Secure Digital) memory card, a USB (Universal Serial Bus) memory, or the like.

(Vehicle)

Figure 3:
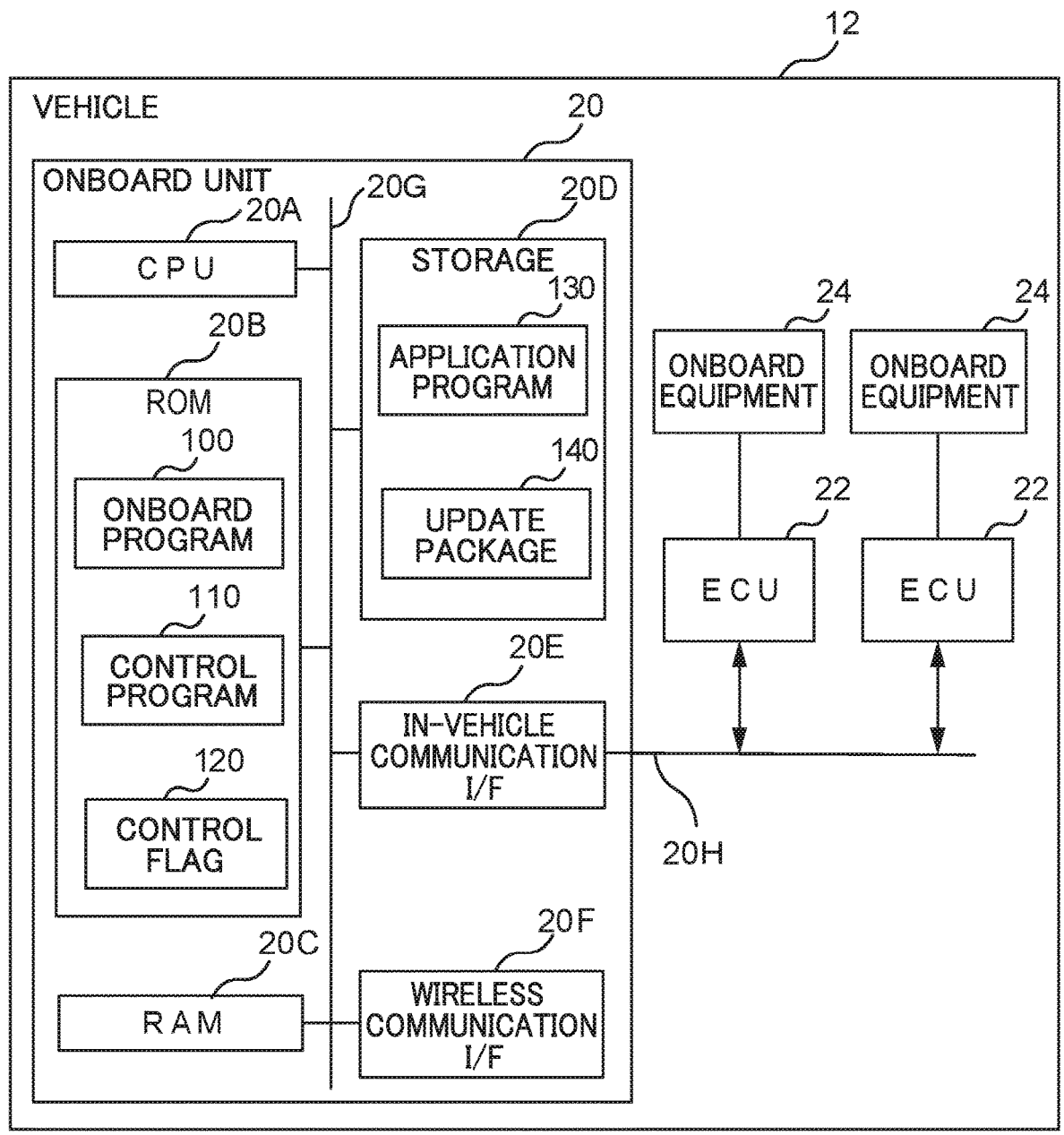
FIG. 3 is a block drawing illustrating hardware structures of a vehicle of the respective embodiments.

As illustrated in FIG. 3, the vehicle 12 relating to the present embodiment is structured to include the onboard unit 20, plural ECUs 22, and plural onboard equipment 24.

The onboard unit 20 is structured to include the CPU 20A, the ROM 20B, a RAM (Random Access Memory) 20C, the storage 20D, an in-vehicle communication I/F (interface)

20E, and a wireless communication I/F 20F. The CPU 20A, the ROM 20B, the RAM 20C, the storage 20D, the in-vehicle communication I/F 20E and the wireless communication I/F 20F are connected so as to be able to communicate with one another via an internal bus 20G.

The CPU 20A is a central computing processing unit, and executes various programs and controls the respective sections. Namely, the CPU 20A reads-out programs from the ROM 20B, and executes the programs by using the RAM 20C as a workspace.

The ROM 20B records various programs and various data. An onboard program 100 that updates respective programs is recorded in the ROM 20B of the present embodiment. Accompanying the execution of the onboard program 100, the onboard unit 20 acquires an update package, and executes processing of updating the control program 110 and the application program 130 that are described later. Further, the control program 110 that carries out control of the onboard unit 20, and a control flag 120 that indicates the control program 110 that is currently being executed, are recorded in the ROM 20B. The RAM 20C temporarily records programs and data as a workspace.

The storage 20D that serves as a memory is structured by an HDD (Hard Disk Drive), an SSD (Solid State Drive), or an eMMC (Embedded Multi Media Card), and various programs and various data are recorded therein. The application program 130 and an update package 140 are recorded in the storage 20D of the present embodiment.

The in-vehicle communication I/F 20E is an interface for connecting the respective ECUs 22. Communication standards in accordance with CAN protocol are used at this interface. The in-vehicle communication I/F 20E is connected to an external bus 20H.

The wireless communication I/F 20F is a wireless communication module for communicating with the central server 30. Communication standards such as, for example 5G, LTE, Wi-Fi®, or the like are used at this wireless communication module. The wireless communication I/F 20F is connected to the network N.

The ECUs 22 are electronic control modules for controlling the onboard equipment 24 that are installed in the vehicle 12. The ECUs 22 are, for example, an ADAS (Advanced Driver Assistance System) ECU, a steering ECU, an engine ECU, and the like. Here, each of the ECUs 22 records a program (hereinafter called "another program") for controlling the onboard equipment connected thereto, and, by executing that another program, executes processing that controls the onboard equipment 24 connected thereto. Here, the ECU 22 is an example of the "another onboard device".

Figure 4:
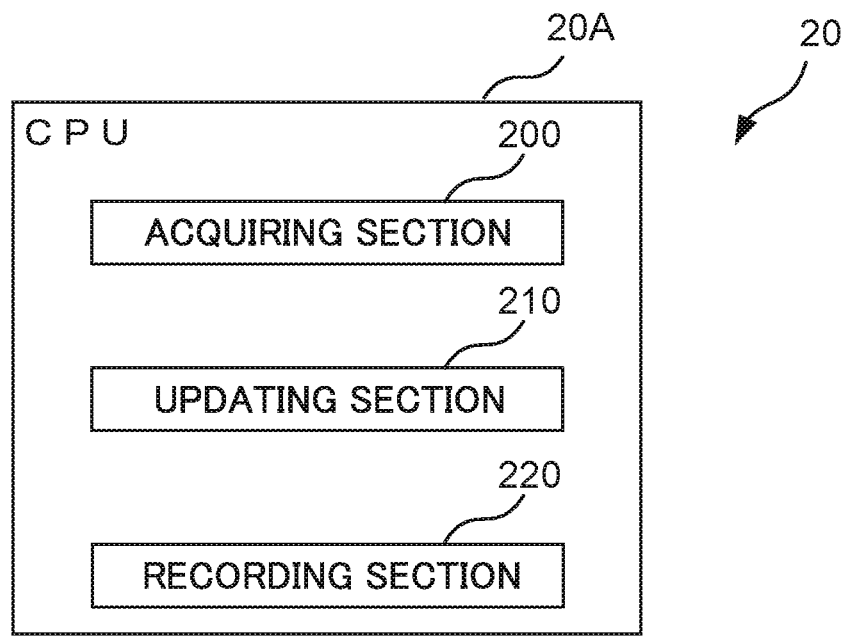
FIG. 4 is a block drawing illustrating functional structures of the onboard device of the respective embodiments.

As illustrated in FIG. 4, at the onboard unit 20 of the present embodiment, due to the CPU 20A executing the onboard program 100, the CPU 20A functions as an acquiring section 200, an updating section 210, and a recording section 220.

The acquiring section 200 has the functions of acquiring the update package 140 from the central server 30, and acquiring the control flag 120 from the ROM 20B. Here, the update package 140 includes at least one of the control program 110 or the application program 130. Note that, in the present embodiment, description is given of a form in which the update package 140 includes at least one of the control program 110 or the application program 130. However, the present disclosure is not limited to this. The update package 140 may include other programs.

The updating section 210 has the function of updating the respective programs in accordance with the programs included in the update package 140. Specifically, in a case in which the control program 110 is included in the acquired update package 140, the updating section 210, by using this control program 110, updates the control program 110 that is recorded in the ROM 20B. The updating section 210 refers to the acquired control flag 120 and updates the control program 110.

Here, the ROM 20B relating to the present embodiment records the control program 110 that is currently being executed, and the control program 110 that is one generation before the control program 110 that is currently being executed. Further, the control flag 120 indicates the recording region in which the control program 110 that is currently being executed is recorded. Specifically, the ROM 20B has two recording regions, which are recording region A and recording region B. The control flag 120 indicates the recording region in which the control program 110 that is currently being executed is recorded. For example, in a case in which the control flag 120 is "0", the control flag 120 expresses that the control program 110 that is currently being executed is recorded in recording region A. In a case in which the control flag 120 is "1", the control flag 120 expresses that the control program 110 that is currently being executed is recorded in recording region B. Note that, in the following description, the recording region in which the control program 110 that is currently being executed is recorded is called the "active bank". The recording region in which the control program 110, which is the object of updating and which is different than the control program 110 that is currently being executed, is recorded is called the "updating bank". Namely, the control flag 120 indicates the active bank. Here, the control program in the active bank is an example of the "control program that is after updating", and the control program in the updating bank is an example of the "control program that is before updating".

At the time of updating the control program 110, the updating section 210 updates the control program 110 that is recorded in the updating bank, which is different than the active bank indicated by the control flag 120. For example, in a case in which the control flag 120 is "0", the updating bank is "recording region B", and therefore, the updating section 210 updates the control program 110 that is recorded in recording region B. In a case in which the control flag 120 is "1", the updating bank is "recording region A", and therefore, the updating section 210 updates the control program 110 that is recorded in recording region A.

Further, the updating section 210 has the function of updating the control flag 120 after updating the control program 110. Specifically, after updating the control program 110, in a case in which the control flag 120 is "0", the updating section 210 updates the control flag 120 to "1", and, in a case in which the control flag 120 is "1", the updating section 210 updates the control flag 120 to "0".

Further, in a case in which the application program 130 is included in the update package 140, the updating section 210, by using that application program 130, updates the application program 130 that is recorded in the storage 20D. In a case in which another program is included in the update package 140, the updating section 210 transmits that another program to the ECU 22 that relates to that another program, and updates that another program.

The recording section 220 has the functions of recording the updated control program 110 in the ROM 20B, and recording the updated application program 130 in the storage 20D. Further, the recording section 220 records the acquired update package 140 in the storage 20D.

Figure 5:
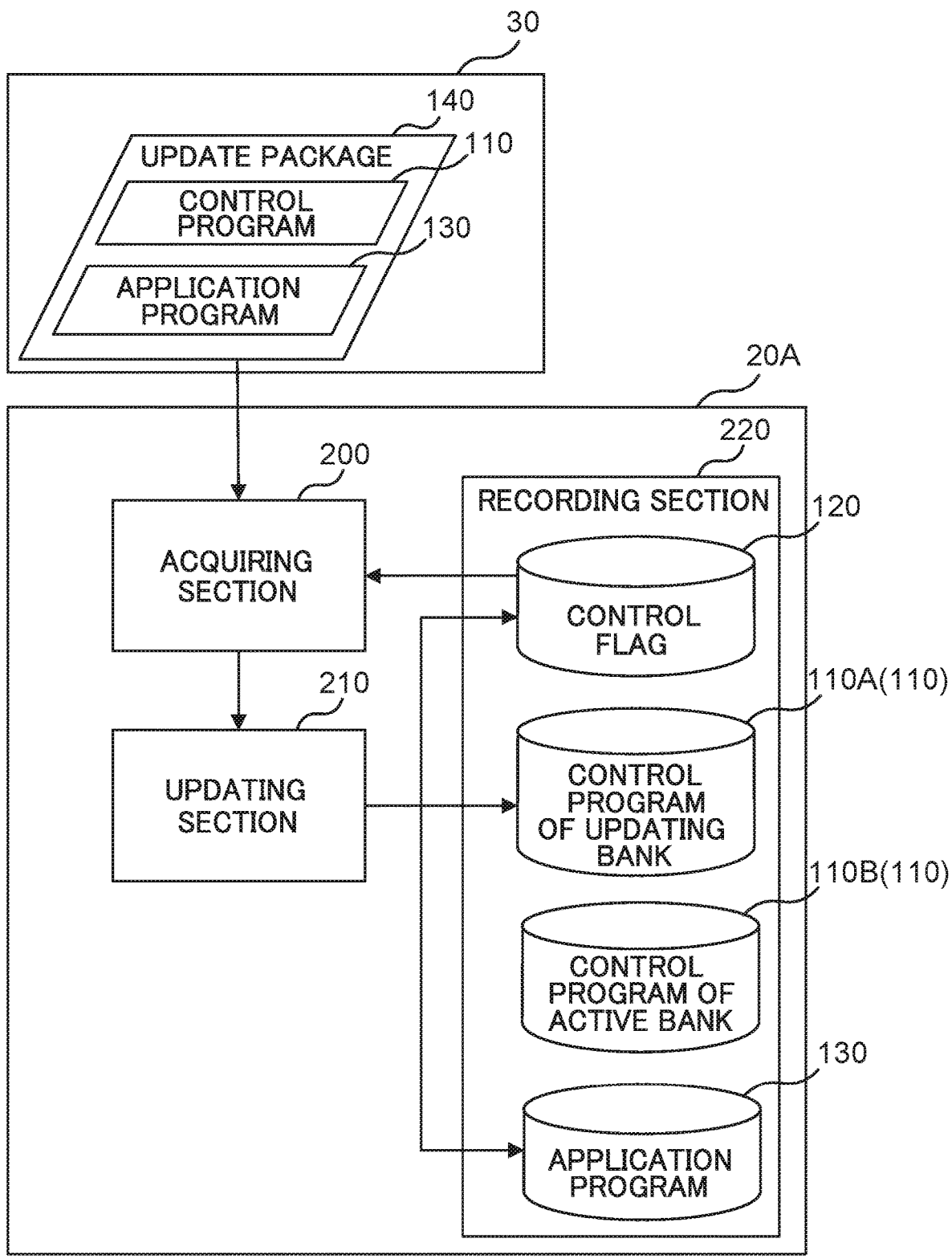
FIG. 5 is a data flow diagram illustrating an example of the flow of data in the processing that is executed at the onboard device of the respective embodiments.

Before describing the operation of the onboard system 10, the flow of data at the onboard unit 20 that serves as the onboard device will be described next with reference to FIG. 5. FIG. 5 is a data flow diagram illustrating an example of the flow of data at the onboard unit 20.

The acquiring section 200 illustrated in FIG. 5 functions as the OTA client 40 of FIG. 2. The acquiring section acquires the update package 140, which includes the control program 110 and the application program 130, from the central server 30, and inputs the update package 140 to the updating section 210. Further, the acquiring section 200 acquires the control flag 120 from the recording section 220, and inputs the control flag 120 to the updating section 210.

The updating section 210 illustrated in FIG. 5 functions as the UCM master 41 and the UCM sub 42 of FIG. 2. By using the programs included in the inputted update package 140, the updating section 210 updates the control program 110 and the application program 130 that are recorded in the recording section 220.

In a case of updating the control program 110, the updating section 210 updates control program 110A of the updating bank in accordance with the inputted control flag 120. For example, after updating the control program 110A of the updating bank, the updating section 210 updates the control flag 120 so as to indicate the control program 110A of the updating bank. By updating the control flag 120, control program 110B of the active bank which was not updated is updated on the occasion of the next updating.

(Flow of Control)

Figure 6:
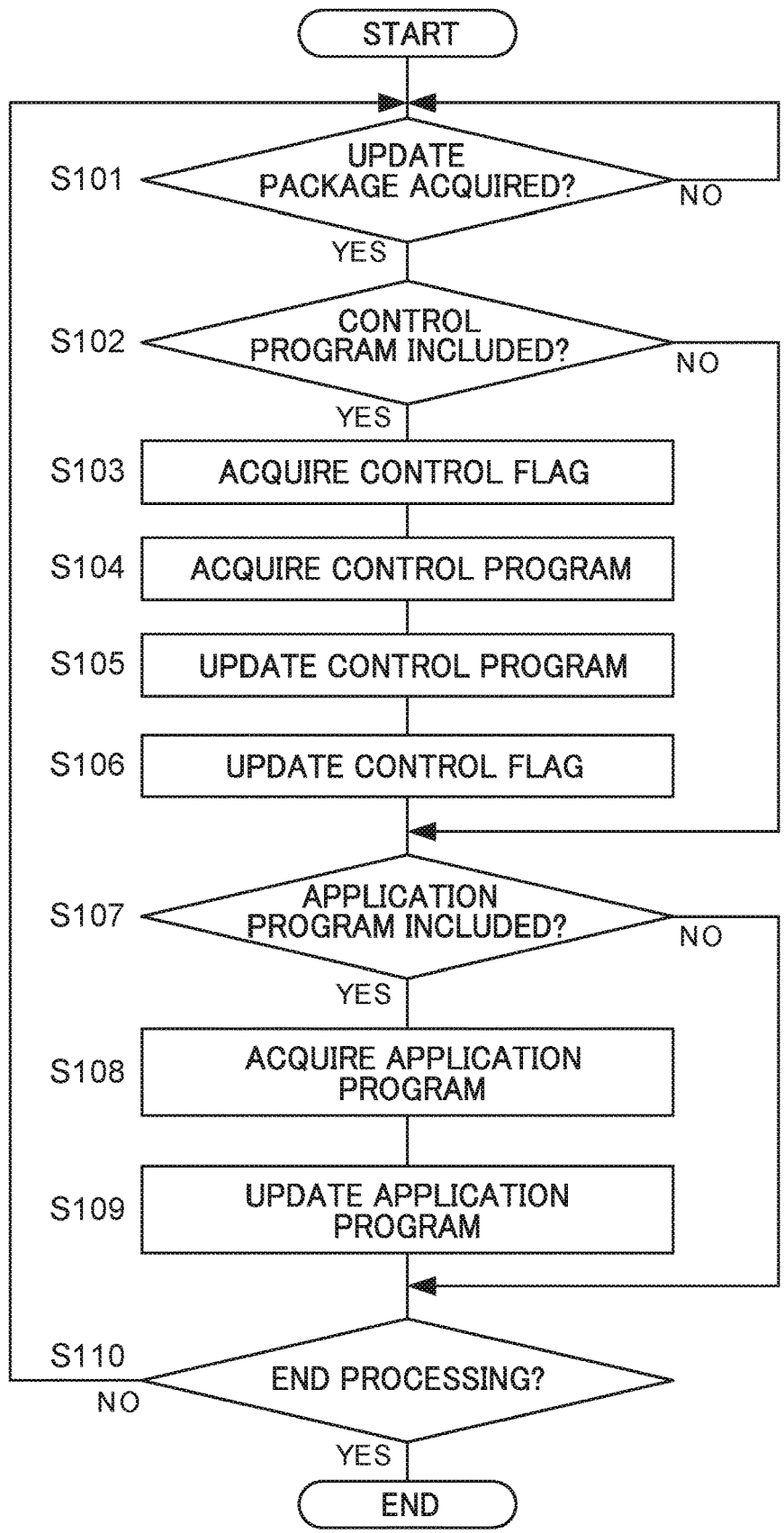
FIG. 6 is a flowchart illustrating the flow of the processing of updating programs, which is executed at the onboard device of a first embodiment.

The flow of processing executed at the onboard system 10 of the present embodiment is described by using the flowchart of FIG. 6. The processing at the onboard unit 20 is executed due to the CPU 20A of the onboard unit 20 functioning as the acquiring section 200, the updating section 210 and the recording section 220. The updating processing illustrated in FIG. 6 is executed, for example, in a case in which an instruction to execute the processing of updating the respective programs is inputted.

In step S101, the CPU 20A judges whether or not the update package 140 has been acquired from the central server 30. In a case in which the update package 140 has been acquired (step S101: YES), the CPU 20A moves on to step S102. On the other hand, in a case in which the update package 140 has not been acquired (step S101: NO), the CPU 20A stands-by until the update package 140 is acquired.

In step S102, the CPU 20A judges whether or not the acquired update package 140 contains the control program 110. In a case in which the control program 110 is included (step S102: YES), the CPU 20A moves on to step S103. On the other hand, in a case in which the control program 110 is not included (step S102: NO), the CPU 20A moves on to step S107.

In step S103, the CPU 20A acquires the control flag 120 from the ROM 20B.

In step S104, the CPU 20A acquires the control program 110 from the update package 140.

In step S105, the CPU 20A updates the control program 110, which is recorded in the updating bank of the ROM 20B, by using the acquired control program 110.

In step S106, the CPU 20A updates the control flag 120.

In step S107, the CPU 20A judges whether or not the acquired update package 140 includes the application program 130. In a case in which the application program 130 is included (step S107: YES), the CPU 20A moves on to step S108. On the other hand, in a case in which the application program 130 is not included (step S107: NO), the CPU 20A moves on to step S110.

In step S108, the CPU 20A acquires the application program 130 from the update package 140.

In step S109, the CPU 20A updates the application program 130, which is recorded in the storage 20D, by using the acquired application program 130.

In step S110, the CPU 20A judges whether or not to end the updating processing. In a case of ending the processing (step S110: YES), the CPU 20A ends the processing. On the other hand, in a case of not ending the processing (step S110: NO), the CPU 20A moves on to step S101.

(Overview of First Embodiment)

The onboard unit 20 of the present embodiment acquires the update package 140, and carries out updating of the control program 110 and the application program 130 in accordance with the programs included in the acquired update package.

As described above, in accordance with the present embodiment, the programs can be updated efficiently.

Second Embodiment

The first embodiment describes a form in which the control program 110 and the application program 130 that are recorded in the onboard unit 20 are updated. The second embodiment describes a form in which another program that is recorded in the ECU 22 also is updated.

Note that the structure of the onboard system (see FIG. 1 and FIG. 2), the example of the hardware structures of the vehicle 12 (see FIG. 3), the example of the functional structures of the onboard unit 20 (see FIG. 4) and the example of the data flow (see FIG. 5) relating to the present embodiment are similar to those of the first embodiment, and therefore, description thereof is omitted. The points that differ from the first embodiment are described hereinafter. Further, the same structures are denoted by the same reference numerals, and description thereof is omitted.

The update package 140 relating to the present embodiment further includes another program that is recorded in the ECU 22. The onboard unit 20 updates the another program that is recorded in the ECU 22, by using the update package 140.

(Flow of Control)

The flow of processing that is executed at the onboard system 10 of the present embodiment is described by using the flowchart of FIG. 7. The processing at the onboard unit 20 is executed due to the CPU 20A of the onboard unit 20 functioning as the acquiring section 200, the updating section 210 and the recording section 220. The updating processing illustrated in FIG. 7 is executed, for example, in a case in which an instruction to execute the processing of updating the respective programs is inputted. Note that, in FIG. 7, steps that are the same as those of the updating processing illustrated in FIG. 6 are denoted by the same step numbers as in FIG. 6, and description thereof is omitted.

In step S111, the CPU 20A judges whether or not the acquired update package 140 contains another program that is recorded in the ECU 22. In a case in which another program is included (step S111: YES), the CPU 20A moves on to step S112. On the other hand, in a case in which another program is not included (step S111: NO), the CPU 20A moves on to step S110.

In step S112, the CPU 20A acquires the another program from the update package 140.

In step S113, the CPU 20A transmits the acquired another program to the ECU 22, and updates the another program that is recorded in the ECU 22.

(Overview of Second Embodiment)

The onboard unit 20 of the present embodiment acquires the update package 140, and carries out updating of another program that is recorded in the ECU 22 in accordance with the another program that is included in the acquired update package.

As described above, in accordance with the present embodiment, the programs can be updated efficiently.

[Notes]

Note that the above embodiments describe forms in which the acquisition of the update package 140 is used as the occasion for updating the respective programs. However, the present disclosure is not limited to this. The occasion upon which the respective programs are updated may be controlled. For example, after the update package 140 is acquired, the respective programs that are included in the update package 140 may be updated in a case in which the engine or the like is stopped and the vehicle 12 is stopped.

Further, the above embodiments describe forms in which the control program 110 that is recorded in the recording region is updated in accordance with the control flag 120 that is stored in the ROM 20B. However, the present disclosure is not limited to this. The application program 130 may be updated in accordance with the control flag. For example, the storage 20D may have plural recording regions and a flag indicating the active bank, and the application program 130 may be recorded in the respective recording regions. The updating section 210 may judge the updating bank of the storage 20D in accordance with the flag, and update the application program 130 of the updating bank.

Note that any of various types of processors other than a CPU may execute the various processing that are executed due to the CPU 20A reading-in software (a program) in the above-described embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processing such as ASICs (Application Specific Integrated Circuits) and the like, and the like. Further, the above-described respective processing may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

The above embodiments describe forms in which the respective programs are stored in advance (are installed) in a non-transitory, computer-readable recording medium. For example, the onboard program 100 at the onboard unit 20 is stored in advance in the ROM 20B. However, the present disclosure is not limited to this. The respective programs may be provided in forms of being recorded in a non-transitory recording medium such as a CD-ROM (Compact Disc Read Only Memory), a DVD-ROM (Digital Versatile Disc Read Only Memory), a USB (Universal Serial Bus) memory, or the like. Further, the programs may be in a form of being downloaded from an external device over a network.

The flows of the processing described in the above embodiments are examples, and unnecessary steps may be deleted therefrom, new steps may be added thereto, or the order of processing may be rearranged, within a scope that does not depart from the gist of the present disclosure.

What is claimed is:

1. An onboard device comprising a processor, wherein the processor:

at the onboard device installed at a vehicle, records a control program that is recorded in a first recording medium and that carries out processing for controlling the onboard device, and an application program that is recorded in a second recording medium different than the first recording medium and that carries out processing on the onboard device;

acquires an update package including at least a first program that updates the control program, and a second program that updates the application program; and carries out updating of the control program and the application program in accordance with the acquired update package;

wherein the processor records, as the control program at the first recording medium, a control program that is before updating and a control program that is after updating, and manages updating of the control program by using a flag.

2. The onboard device of claim 1, wherein, in a case in which a third program that updates another program stored in another onboard device is further included in the update package, the processor transmits the third program to the other onboard device and carries out updating of the other program.

3. The onboard device of claim 1, wherein the processor acquires the update package via wireless communication.

4. A vehicle comprising:

the onboard device of claim 1; and at least one other onboard device that is connected to the onboard device.

5. The vehicle of claim 4, wherein, after the update package is acquired, in a case in which an engine is stopped, the onboard device carries out updating of the control program and the application program by using the acquired update package.

6. A control method in which a computer executes processing comprising:

at an onboard device installed at a vehicle, recording a control program that is recorded in a first recording medium and that carries out processing for controlling the onboard device, and an application program that is recorded in a second recording medium different than the first recording medium and that carries out processing on the onboard device;

acquiring an update package including at least a first program that updates the control program, and a second program that updates the application program;

carrying out updating of the control program and the application program in accordance with the acquired update package;

recording, as the control program at the first recording medium, a control program that is before updating and a control program that is after updating, and managing updating of the control program by using a flag.

7. A non-transitory computer readable recording medium storing an onboard program that executable by a computer to perform processing comprising:

at the onboard device installed at a vehicle, recording a control program that is recorded in a first recording medium and that carries out processing for controlling the onboard device, and an application program that is recorded in a second recording medium different than the first recording medium and that carries out processing on the onboard device;
acquiring an update package including at least a first program that updates the control program, and a second program that updates the application program;
carrying out updating of the control program and the application program in accordance with the acquired update package;
recording, as the control program at the first recording medium, a control program that is before updating and a control program that is after updating, and
managing updating of the control program by using a flag.

* * * * *